US010749901B2

(12) United States Patent
Glenn

(10) Patent No.: US 10,749,901 B2
(45) Date of Patent: Aug. 18, 2020

(54) ASSOCIATING A POLICY-BASED FIREWALL WITH A DYNAMIC DNS HOSTNAME

(71) Applicant: Verisign, Inc., Reston, VA (US)

(72) Inventor: Nathan Glenn, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 460 days.

(21) Appl. No.: 15/207,471

(22) Filed: Jul. 11, 2016

(65) Prior Publication Data

US 2018/0013792 A1 Jan. 11, 2018

(51) Int. Cl.
*H04L 29/06* (2006.01)
(52) U.S. Cl.
CPC .......... *H04L 63/20* (2013.01); *H04L 63/0263* (2013.01)
(58) Field of Classification Search
CPC . H04L 61/1511; H04L 63/0236; H04L 63/08; H04L 63/0263; H04L 61/2076; H04L 63/10; H04L 63/20
See application file for complete search history.

(56) References Cited

U.S. PATENT DOCUMENTS

| | | | | |
|---|---|---|---|---|
| 7,451,234 B1 * | 11/2008 | Bonner | ............. | H04L 29/12066 709/220 |
| 2002/0010798 A1 * | 1/2002 | Ben-Shaul | .......... | G06F 17/3089 709/247 |
| 2007/0271453 A1 * | 11/2007 | Pohja | .................... | H04L 63/029 713/153 |
| 2012/0240213 A1 * | 9/2012 | Lin | ..................... | H04L 61/1511 726/12 |
| 2012/0311693 A1 * | 12/2012 | Horman | .............. | H04L 63/0263 726/14 |
| 2013/0205018 A1 * | 8/2013 | Rahman | .................. | H04L 67/16 709/224 |
| 2014/0204950 A1 * | 7/2014 | Willars | ............... | H04L 61/1511 370/392 |
| 2014/0344917 A1 * | 11/2014 | Parla | ................... | H04L 63/0272 726/15 |
| 2015/0350229 A1 * | 12/2015 | Mitchell | ............ | H04L 63/1425 726/23 |
| 2017/0085549 A1 * | 3/2017 | Donaldson | .............. | H04L 29/06 |
| 2018/0115582 A1 * | 4/2018 | Thakar | ................ | H04L 63/1466 |
| 2018/0167362 A1 * | 6/2018 | Glenn | ................ | H04L 61/1511 |

* cited by examiner

*Primary Examiner* — Amir Mehrmanesh
(74) *Attorney, Agent, or Firm* — Artegis Law Group, LLP

(57) ABSTRACT

Various embodiments of the invention disclosed herein provide techniques for associating a firewall policy with a dynamic domain name system (DNS) hostname. A policy configuration portal transmits a first request to a names server to translate a first hostname into a corresponding network address. The policy configuration portal receives a first network address from the names server in response to the first request. The policy configuration portal determines that the first network address is different than a second network address that is currently associated with the first hostname. The policy configuration portal associates the first network address with the first hostname. The policy configuration portal modifies a firewall policy configuration associated with the first hostname to include the first network address. At least one advantage of the disclosed techniques is that a firewall policy can be implemented for a residential home or small business that employs dynamic IP addressing.

16 Claims, 4 Drawing Sheets

ASSOCIATING A POLICY-BASED FIREWALL WITH A DYNAMIC DNS HOSTNAME

BACKGROUND OF THE INVENTION

Field of the Invention

The present invention relates generally to computer networks and, more specifically, to associating a policy-based firewall with a dynamic DNS hostname.

Description of the Related Art

In the domain of computer networks, a firewall provides protection and security for one or more computing devices connected to a network. Among other things, the firewall monitors and controls incoming and outgoing network messages on behalf of the one or more computing devices. The firewall commonly performs these monitoring and control operations by applying security rules or policies to the incoming and outgoing messages. As a result, the firewall establishes a barrier or filter between a trusted, secure internal network shared by the one or more computing devices and a larger external network, such as the internet, that is presumed to be untrustworthy or unsecure.

During operation, the firewall typically applies the security rules or policies based on a block of one or more static internet protocol (IP) addresses. As the firewall intercepts each network message, the firewall identifies the source IP address associated with the network message, identifies a block of static IP addresses to which the source IP address belongs, and applies the appropriate security rules or policies to the network message based on the block of static IP addresses. In so doing, the firewall filters or discards network messages considered to be untrustworthy or unsecure, according to the security rules and policies, and passes trusted, secure messages between the one or more computing devices and the external network.

One drawback of the above approach is that blocks of static IP addresses are expensive to purchase or lease. For example, the cost to reserve a large block of static IP addresses could cost millions of dollars, paid to an internet authority that registers and maintains such blocks of static IP addresses. Smaller blocks of static IP addresses can be purchased or leased from an internet service provider (ISP). However, purchasing or leasing even small blocks of IP addresses typically involves expensive fees. Consequently, usually only relatively large enterprises can afford to purchase or lease blocks of static IP addresses.

Another drawback of the above approach is that ISPs oftentimes employ dynamic IP addressing for smaller entities, such as residential homes and small businesses. With dynamic IP addressing, the IP address associated with a given computing device for a home or small business changes at more or less regular intervals, such as once per week, once per day, or once every few hours. When a current IP address expires at the end of the regular interval, the ISP providing service for the computing device issues a new IP address for the computing device. However, as described, firewalls apply security rules or policies based on the source IP addresses associated with network messages. Consequently, IP addresses that change dynamically are incompatible with conventional firewalls. Accordingly, traditional firewalls are generally unable to provide properly protect computers located in homes and small businesses where dynamic IP addressing is employed.

One approach to solving the dynamic IP addressing problem is for ISPs to offer custom firewall solutions to their customers. However, these custom firewall solutions often require proprietary software to be pre-installed on a particular model and brand of internet router. The proprietary software applies a chaining policy to the router. The chaining policy enables the router to pass through any changes in IP address to the custom firewall solution provider by communicating new IP addresses received from an ISP to the custom firewall solution provider via a proprietary application protocol interface (API). Although custom firewall solutions can ultimately provide the necessary protection for homes and smaller business, the proprietary software and router are expensive, and a certain level of expertise is needed to make informed choices about which solutions are most appropriate for specific homes or small businesses.

As the foregoing illustrates, what is needed in the art is a non-proprietary firewall solution for home and small business internet systems that do not employ static IP addresses.

SUMMARY OF THE INVENTION

Various embodiments of the present application set forth a method for associating a firewall policy with a dynamic domain name system (DNS) hostname. The method includes transmitting a first request to a names server to translate a first hostname into a corresponding network address. The method further includes receiving a first network address from the names server in response to the first request. The method further includes determining that the first network address is different than a second network address that is currently associated with the first hostname. The method further includes associating the first network address with the first hostname. The method further includes modifying a firewall policy configuration associated with the first hostname to include the first network address.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that a firewall policy can be implemented for a residential home or small business that employs dynamic IP addressing. As a result, residential and small business users do not need to incur the expense of purchasing or leasing static IP addresses. Another advantage of the disclosed techniques is that such a firewall can be implemented with virtually any dynamic DNS service provider and with any router that supports dynamic DNS without being tied to a proprietary solution.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
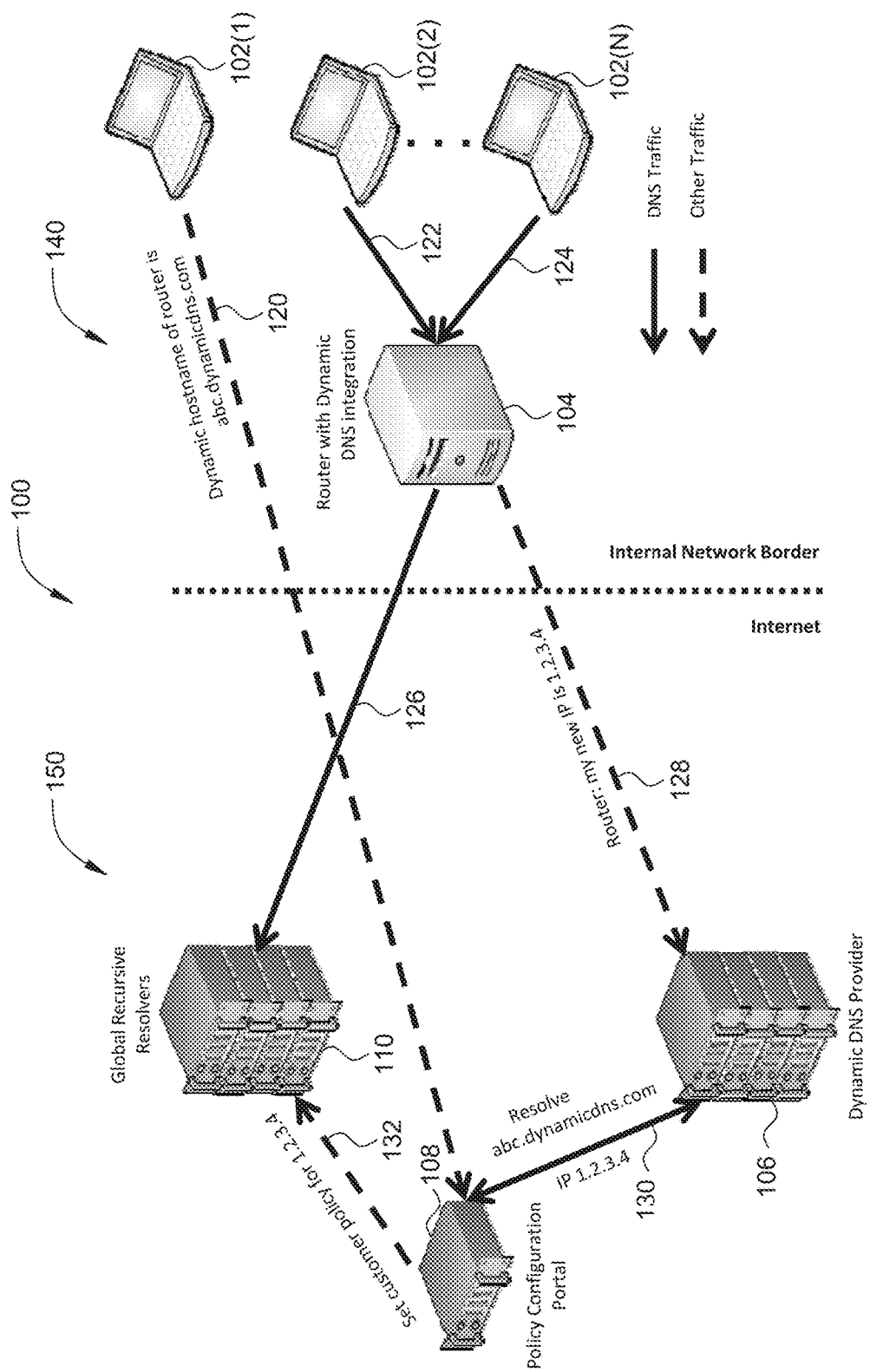
FIG. 1 illustrates a system configured to implement one or more aspects of the present invention.

FIG. 1 illustrates a system 100 configured to implement one or more aspects of the present invention. As shown, the system includes client devices 102(1), 102(2), . . . 102(N), a router 104, a dynamic DNS provider 106, a policy configuration portal 108, and global recursive resolvers 110.

Client devices 102(1), 102(2), . . . 102(N) include any types of computing devices associated with an internal network 140. Each of the client devices 102(1), 102(2), . . . 102(N) includes a computing device that may be a personal computer, video game console, personal digital assistant, mobile phone, mobile device, or any other device suitable for implementing one or more aspects of the present invention.

Client device 102(1) communicates with policy configuration portal 108 over communications link 120. In some embodiments, client device 102(1) may communicate with policy configuration portal 108 via router 104 through an alternative communications link (not explicitly shown). In operation, client device 102(1) transmits information to policy configuration portal 108 to communicate information associated with internal network 140, including, without limitation, the dynamic DNS hostname associated with router 104 and various firewall rules and policies associated with router 104.

A hostname is associated with a particular a computing device connected to a computer network, such as the internet. The hostname uniquely identifies the computing device to other devices within a given network. A names service, such as DNS, provides a mechanism for translating the hostname to a network address, such as an IP address, or vice versa. Various servers distributed throughout the network provide translations between hostnames and corresponding network addresses. Such servers are referred to herein as names servers. These names servers support translations for hostnames associated with static IP addresses, hostnames associated with dynamic DNS services, or both.

The process of translating the hostname to a network address, such as an IP address, is referred to herein as "resolving" the hostname to the network address. In the context of internet communications, a hostname can include any one or more of the following components: (1) a host specific label; (2) a domain name, such as a domain name registered with a service such as DNS; and (3) a top-level domain (TLD) such as .com, .net, or .edu. A hostname that includes all three of these components is typically referred to as a fully qualified domain name (FQDN).

In various embodiments, the communications between client device 102(1) and policy configuration portal 108 may be DNS traffic or other types of traffic. Client devices 102(2) . . . 102(N) communicate with various devices connected to the internet 150, such as global recursive resolvers 110 via router 104. Specifically, client device 102(2) communicates with various devices connected to the internet 150 via router 104 through communications link 122. Likewise, client device 102(N) communicates with various devices connected to the internet 150 via router 104 through communications link 124. In some embodiments, client device 102(1) may also communicate via router 104 with various devices connected the internet 150, such as global recursive resolvers 110 through a communications link (not explicitly shown).

Router 104 includes any router configured to support dynamic DNS routing. Router 104 includes a computing device that may be a personal computer, router controller, server, mobile device, or any other device suitable for implementing one or more aspects of the present invention. In operation, router 104 routes various DNS traffic and other network messages between client devices 102(1), 102(2), . . . 102(N) and various devices connected to the internet 150, such as global recursive resolvers 110. For example, router 104 could exchange DNS traffic with client devices 102(2) and 102(N) through communications links 122 and 124, respectively. Router 104, in turn, exchanges DNS traffic with various devices connected to the internet 150, such as global recursive resolvers 110 through communications link 126.

Periodically, router 104 receives a new IP address from an ISP (not explicitly shown). In some embodiments, router 104 receives a new IP address at regular intervals, including, without limitation, once every few hours, once per day, or once per week. In some embodiments, router 104 receives a new IP address upon the occurrence of a particular event. One such event is the expiration of a "time-to-live" (TTL) parameter associated with the current IP address associated with router 104. The TTL parameter specifies a minimum amount of time a particular IP address remains valid before a new IP address is issued by the ISP to replace the current IP address.

In response to receiving a new IP address, router 104 connects to dynamic DNS provider 106 via communications link 128. Router 104 transmits a message to one or more names servers associated with dynamic DNS provider 106 over communications link 128. In various embodiments, this message may be DNS traffic or other types of traffic. The message includes the new IP address and the corresponding hostname. In some embodiments, the message may further include a TTL parameter corresponding to the new IP address.

Dynamic DNS provider 106 communicates with router 104 via communications link 128. Dynamic DNS provider 106 includes one or more names servers that receive messages from router 104, where such messages include the new IP address for router 104 along with the corresponding hostname. Each of the names servers includes a computing device that may be a personal computer, router controller, server, mobile device, or any other device suitable for implementing one or more aspects of the present invention. In some embodiments, the messages may further include a TTL parameter corresponding to the new IP address. In response, the names servers associated with dynamic DNS provider 106 update a record in a names database to reflect the new IP address associated with the hostname. In some embodiments, the names servers associated with dynamic DNS provider 106 may further update the record in the names database to reflect the TTL parameter associated with the new IP address.

Policy configuration portal 108 communicates with client device 102(1) over communications link 120. Policy configuration portal 108 includes a computing device that may be a personal computer, router controller, server, mobile device, or any other device suitable for implementing one or more aspects of the present invention. When a new account is initially provisioned, policy configuration portal 108 receives information associated with internal network 140, including, without limitation, the dynamic hostname associated with router 104 and various firewall rules and policies associated with router 104. Policy configuration portal 108 then updates a record in a policy configuration database associated with router 104 to reflect the received information. After initial provisioning is complete, policy configuration portal 108 may receive updated information, such as new or modified firewall rules or policies for a particular hostname. Policy configuration portal 108 then modifies the record in the policy configuration database associated with router 104 to reflect the received information.

Policy configuration portal 108 periodically requests that the hostnames included in the policy configuration database be resolved to corresponding IP addresses. For example, and without limitation, policy configuration portal 108 transmits such requests once every five minutes for each hostname included in the policy configuration database. In operation, policy configuration portal 108 transmits a request to one or more names servers associated with dynamic DNS provider 106 to resolve a particular hostname included within the policy configuration database through communications link 130. In response, one of the names servers associated with dynamic DNS provider 106 responds with a message that includes the hostname and the current IP address associated with the hostname, as reflected in the names database. In some embodiments, the message further includes the TTL parameter associated with the current IP address for the given hostname, as also reflected in the names database. In various embodiments, messages exchanged between policy configuration portal 108 and the one or more names servers associated with dynamic DNS provider 106 may be DNS traffic or other types of traffic. In one example, and without limitation, policy configuration portal 108, when communicating over communication link 130, would be doing a DNS lookup for a given FQDN to retrieve the associated IP address from dynamic DNS provider 106. In such cases, the communications over communication link 130 would be DNS traffic.

If the IP address received from dynamic DNS provider 106 is the same as the IP address for the hostname, as reflected in the policy configuration database, then policy configuration portal 108 maintains the current information for the hostname, including the association between the hostname and the corresponding current IP address, as reflected in the policy configuration database. If the IP address received from dynamic DNS provider 106 is different than the IP address for the hostname, as reflected in the policy configuration database, then policy configuration portal 108 updates the current information for the hostname in the policy configuration database to reflect the new IP address. In some embodiment, if the message includes a TTL parameter for the new IP address, then policy configuration portal 108 updates the current information for the hostname in the policy configuration database to reflect the TTL parameter as well. In such embodiments, policy configuration portal 108 waits for a duration of time specified by the TTL parameter before transmitting another request to resolve the corresponding hostname. After the duration of time specified by the TTL parameter expires, policy configuration portal 108 periodically transmits requests to resolve the corresponding hostname until a new IP address is received for the hostname.

Further, policy configuration portal 108 transmits messages to one or more global recursive resolvers 110 through communications link 132. In various embodiments, these messages may be DNS traffic or other types of traffic. The messages include the new IP address associated with the hostname and the corresponding firewall rules or policies. In so doing, policy configuration portal 108 sets firewall rules or policies within global recursive resolvers 110 for the new IP address. Correspondingly, in some embodiments, policy configuration portal 108 may further transmit messages to global recursive resolvers 110 with instructions to remove firewall rules or policies related to expired IP addresses.

Global recursive resolvers 110 receive DNS traffic from various routers, such as router 104, over communications link 126. Each of the global recursive resolvers 110 includes a computing device that may be a personal computer, router controller, server, mobile device, or any other device suitable for implementing one or more aspects of the present invention. The DNS traffic includes network messages related to requests for content from various content sources on the internet 150. Global recursive resolvers 110 resolve these requests for content by determining the IP addresses for one or more sources of the requested content. Global recursive resolvers 110 discover and perform the needed routing to transfer content between router 104 and content sources. Global recursive resolvers 110 also monitor source IP addresses of the network messages in the DNS traffic to see if one or more firewall rules or policies are to be applied to the network messages. In the case of static IP addresses, global recursive resolvers 110 compare the source IP address to one or more blocks of static IP addresses associated with a firewall service. If the source IP address for a network message maps to one of the static IP blocks, global recursive resolvers 110 apply the firewall rules or policies associated with the corresponding static IP address block to the network message prior to routing the network message.

In the case of dynamic addresses, global recursive resolvers 110 periodically receive messages from policy configuration portal 108. In various embodiments, these messages may be DNS traffic or other types of traffic. The messages include new IP address associated with a dynamic DNS hostname and corresponding firewall rules or policies. In response, global recursive resolvers 110 set the received firewall rules or policies for the new IP address. In some embodiments, global recursive resolvers 110 may further receive messages from policy configuration portal 108 with instructions to remove firewall rules or policies related to expired IP addresses.

In general, global recursive resolvers 110 are geographically dispersed, where each of a group of edge sites in different geographical locations is equipped with multiple global recursive resolvers 110. In one example, and without limitation, 15 to 20 edge sites are deployed in various geographical locations on the globe, where each edge is equipped with 10 to 20 global recursive resolvers 110. Such a deployment of global recursive resolvers 110 at geographically diverse edge site locations help to reduce the latency between routers, such as router 104, and content sources, regardless of where the routers are content sources are located.

Associating a Policy-Based Firewall with a Dynamic DNS Hostname

Figure 2:
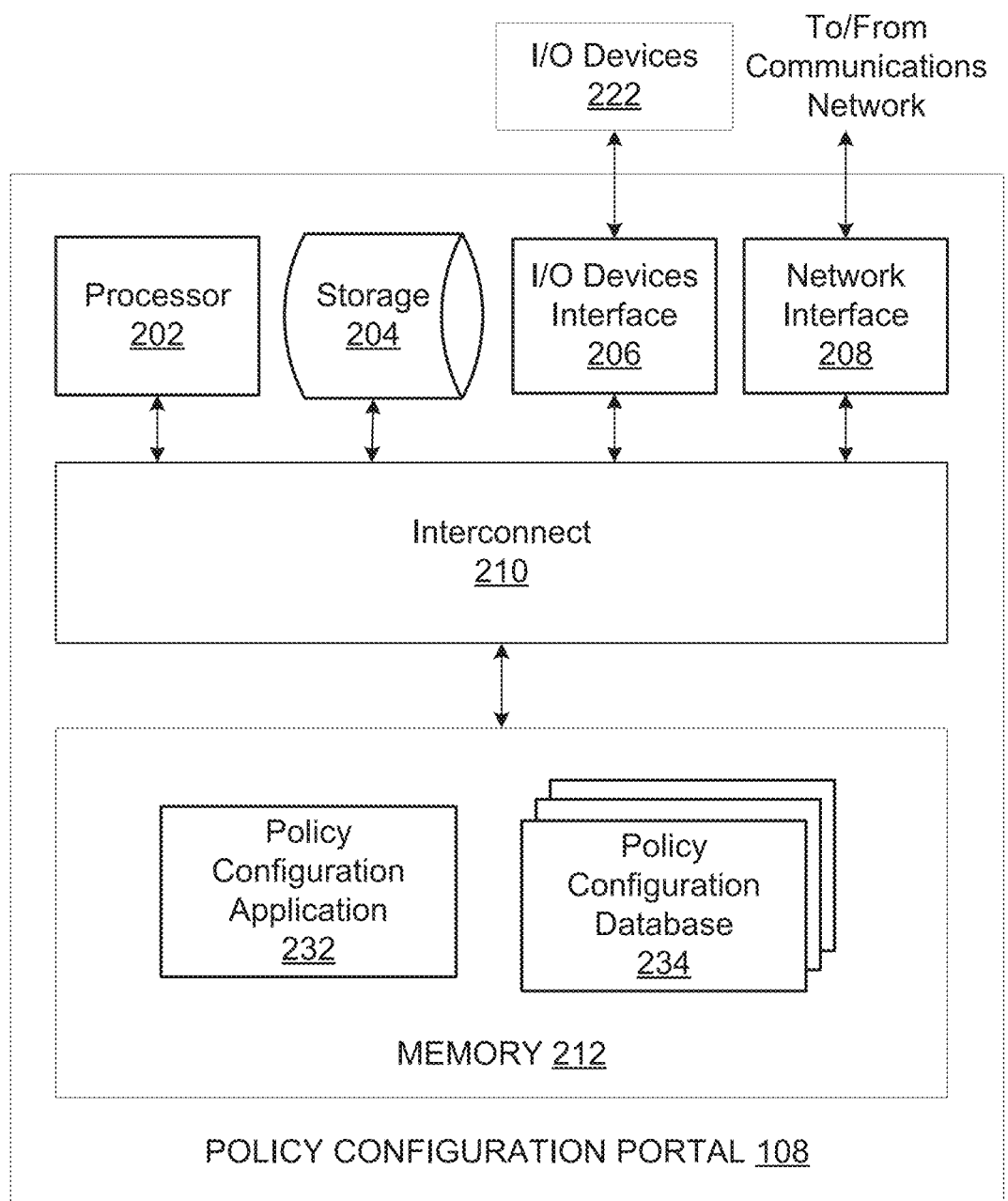
FIG. 2 is a more detailed illustration of the policy configuration portal of FIG. 1, according to various embodiments of the present invention.

FIG. 2 is a more detailed illustration of the policy configuration portal 108 of FIG. 1, according to various embodiments of the present invention. As shown, the policy configuration portal 108 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further includes a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a policy configuration application 232 and a policy configuration database 234. The policy configuration application 232, when executed by the processor 202, performs one or more operations associated with the policy configuration portal 108 of FIG. 1, as further described herein. In operation, policy configuration application 232 communicates with client device 102(1) over communications link 120 to receive information that includes, without limitation, the dynamic hostname associated with router 104 and various firewall rules and policies associated with router 104. Policy configuration application 232 then updates a record in policy configuration database 234 associated with router 104 to reflect the received information.

Policy configuration application 232 periodically requests that the hostnames included in the policy configuration database 234 be resolved to corresponding IP addresses. In operation, policy configuration application 232 transmits a request to one or more names servers associated with dynamic DNS provider 106 to resolve a particular hostname included within the policy configuration database through communications link 130. If a new IP address for a given hostname is received in response to such a request, policy configuration application 232 updates the record in policy configuration database 234 associated with router 104 to reflect the new IP address. In some embodiments, policy configuration application 232 updates the record in policy configuration database 234 associated with router 104 to reflect a TTL parameter associated with the new IP address for the given hostname, as also received from dynamic DNS provider 106. Policy configuration application 232 transmits messages to global recursive resolvers 110 that include new IP addresses received from dynamic DNS provider 106, along with corresponding firewall rules or policies. In so doing, policy configuration application 232 sets firewall rules or policies within global recursive resolvers 110 for the new IP address. Correspondingly, in some embodiments, policy configuration application 232 may further transmit messages to global recursive resolvers 110 with instructions to remove firewall rules or policies related to expired IP addresses.

It will be appreciated that the system shown herein is illustrative and that variations and modifications are possible. In one example, although the network addresses are described herein as IP addresses, any suitable network address may be employed within the scope of the disclosure.

Further, the present disclosure describes implementations of firewall rules and policies for dynamic DNS routers in conjunction with global recursive resolvers. Firewall rules and policies for a dynamic DNS account are transmitted by a policy configuration portal to one or more global recursive resolvers. The global recursive resolvers then perform firewall filtering based on the firewall rules and policies transmitted by the policy configuration portal. However, other implementations are possible within the scope of this disclosure. In one example, and without limitation, the disclosed approach could be deployed to implement hypertext transfer protocol (HTTP) traffic filtering and related data communication traffic filtering for the World Wide Web. Such implementations could provide HTTP traffic and other data filtering as a cloud-based service. In another example, and without limitation, firewall filtering for dynamic DNS clients could be performed by a DNS firewall server rather than by global recursive resolvers. In such cases, the policy configuration portal transmits the firewall rules and policies for the dynamic DNS client to a DNS firewall server. The DNS firewall server could be implemented on the same computing device as the policy configuration portal or one or more other computing devices. In such cases, the DNS firewall server could perform DNS firewall filtering for dynamic DNS clients as a cloud-based service. The DNS firewall server would effectively act as a proxy for the dynamic DNS client's cleaned DNS traffic to one or more global recursive resolvers after the raw DNS traffic has been filtered according to the firewall rules or policies.

Figure 3A:
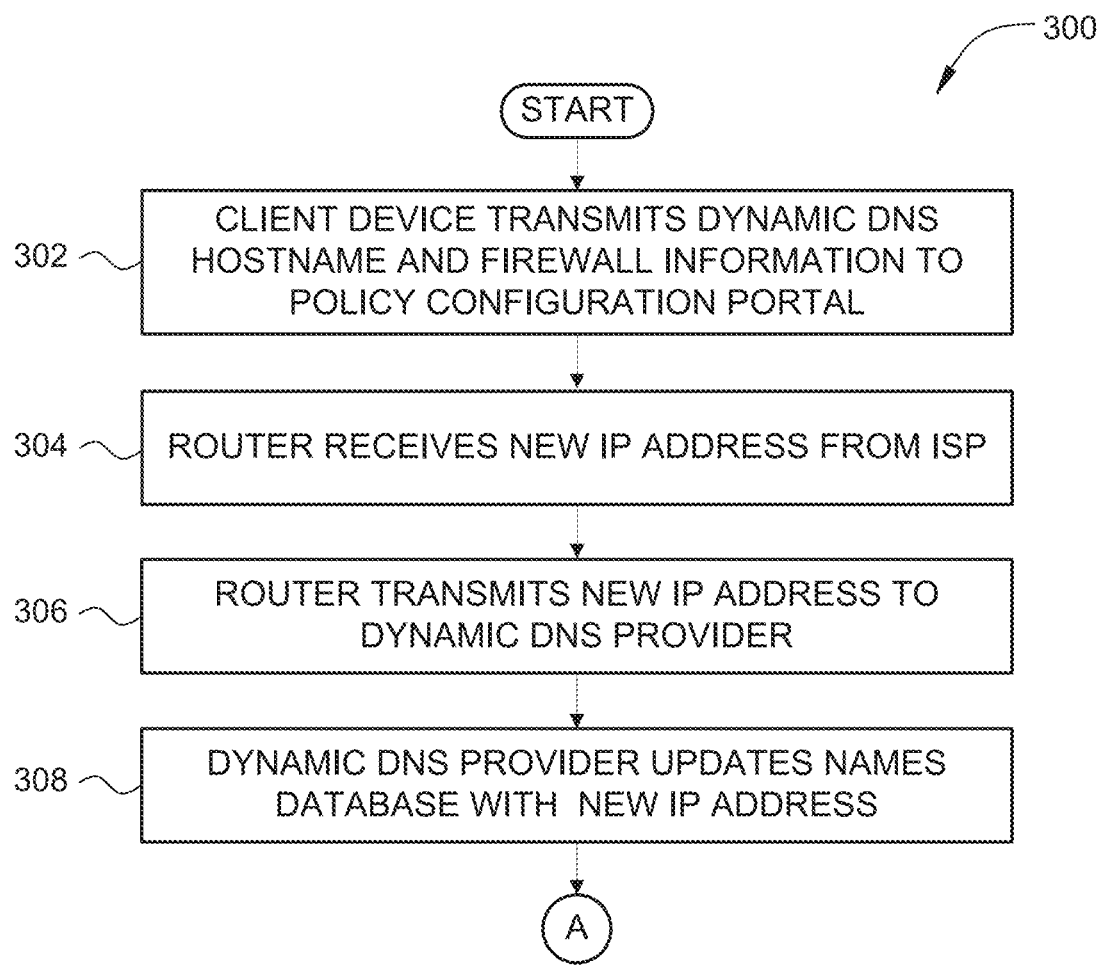
FIGS. 3A-3B set forth a flow diagram of method steps for associating a firewall policy with a dynamic domain name system (DNS) hostname, according to various embodiments of the present invention.
Figure 3B:
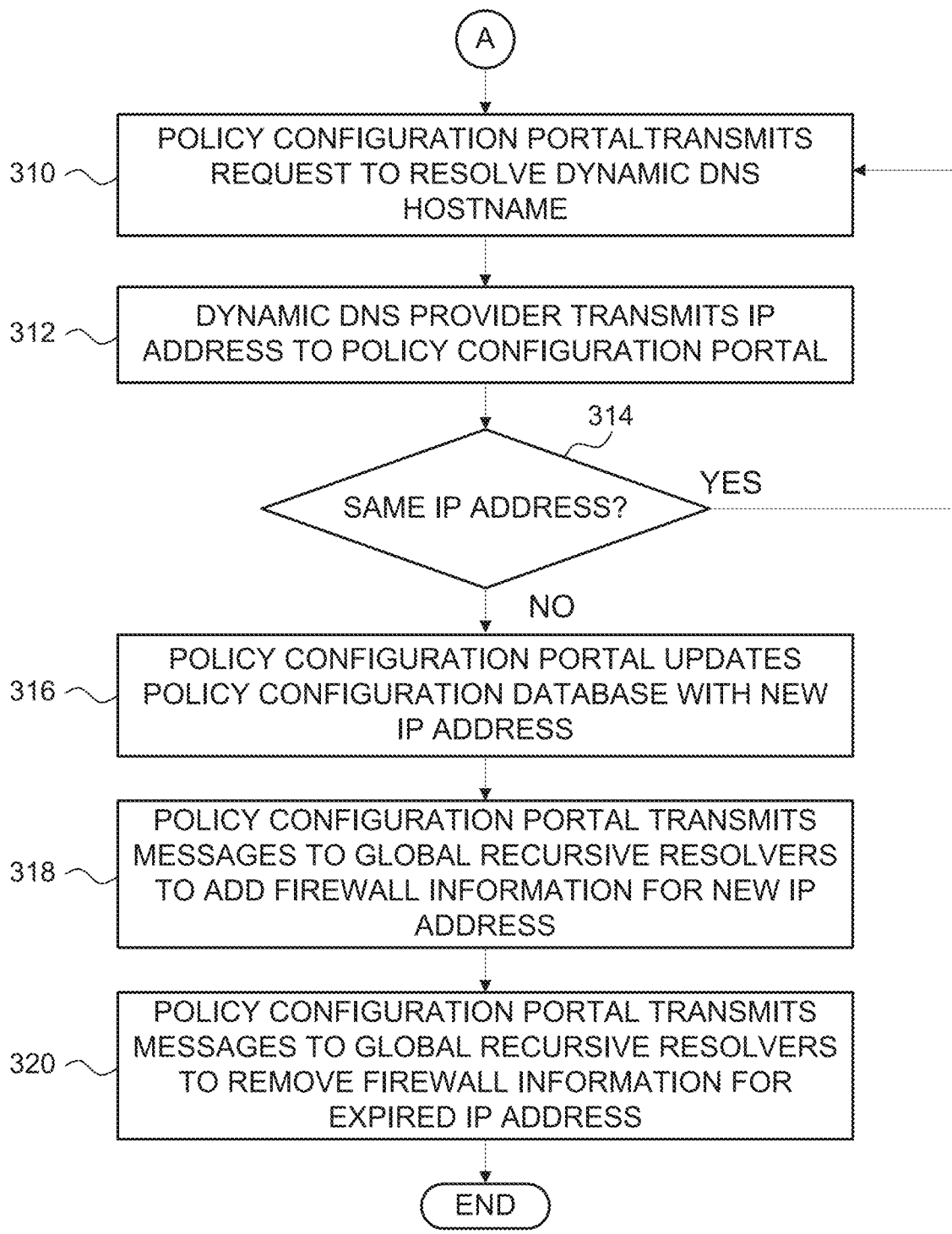

FIGS. 3A-3B set forth a flow diagram of method steps for associating a firewall policy with a dynamic domain name system (DNS) hostname, according to various embodiments of the present invention, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where a client device transmits information to a policy configuration portal 108 regarding a dynamic DNS account associated with a firewall service. The information includes a dynamic DNS hostname along with one or more firewall rules or policies. The firewall rules or policies define which forms of network traffic are considered to be trusted and secure and which forms of network traffic are not. At step 304, a router associated with the dynamic DNS account receives a new IP address from an ISP. In some embodiments, the router may also receive a TTL parameter associated with the new IP address. At step 306, the router transmits the new IP address and the corresponding dynamic DNS hostname to one or more names servers associated with a dynamic DNS provider. In some embodiments, if the router also received a TTL parameter, the router may also transmit TTL parameter associated with the new IP address to the names servers associated with the dynamic DNS provider. At step 308, one of the names servers associated with the dynamic DNS provider updates a record in a names database to reflect that the new IP address is associated with the corresponding hostname. In some embodiments, the names server may also update the record to reflect the TTL parameter.

At step 310, the policy configuration portal transmits a request to the names servers associated with the dynamic DNS provider to resolve the dynamic DNS hostname. In some embodiments, the policy configuration portal waits for a duration of time specified by a current TTL parameter associated with the dynamic DNS hostname before transmitting the request. Further, the policy configuration portal may limit the frequency of requests for a given hostname, such as once every five minutes. At step 312, one of the names servers associated with the dynamic DNS provider transmits a message to the policy configuration portal that includes the dynamic DNS hostname, the IP address, and, if present, the corresponding TTL parameter. At step 314, the policy configuration portal determines whether the IP address is the same as the current IP address associated with the dynamic DNS hostname. If the IP address is the same as the current IP address, then the method proceeds to step 310, described above.

If, however, at step 314, the IP address is not the same as the current IP address, then the method proceeds to step 316, where the policy configuration portal updates a record in the policy configuration database to associate the new IP address with the dynamic DNS hostname and, if appropriate, the corresponding TTL parameter. Correspondingly, the IP address previously associated with the dynamic DNS hostname is considered to be expired. At step 318, the policy configuration portal transmits messages to one or more global recursive resolvers that include the new IP address and one or more corresponding firewall rules or policies. At step 320, the policy configuration portal transmits messages to one or more global recursive resolvers to remove firewall rules or policies associated with the expired IP address. The method 300 then terminates.

In sum, a policy configuration portal receives a hostname and associated firewall policy configuration information from a client device associated with a router that supports dynamic DNS operation. In operation, the router periodically receives new IP addresses related to the associated computing devices from an ISP. The router forwards the new IP addresses to one or more names servers associated with a dynamic DNS provider as the new IP addresses are received. The policy configuration portal transmits requests to the names servers requesting that the names servers resolve the hostname to an IP address. One of the names servers responds to the request by transmitting the IP address currently associated with the hostname. The policy configuration portal compares this IP address with the IP address currently associated with the hostname. If the two IP addresses are the same, the policy configuration portal maintains the current association between the hostname and IP address as well as the current firewall policy configuration information. Further, the policy configuration portal schedules a time for a subsequent request to be transmitted. If the two IP addresses are not the same, the policy configuration portal updates the firewall policy configuration information with the new IP address. The policy configuration portal transmits the updated firewall policy configuration information to globally located recursive resolvers. The recursive resolvers then resolve network traffic associated with the hostname by using the new IP address.

At least one advantage of the disclosed techniques is that a firewall policy can be implemented for a residential home or small business that employs dynamic IP addressing. As a result, residential and small business users do not need to incur the expense of purchasing or leasing static IP addresses. Another advantage of the disclosed techniques is that such a firewall can be implemented with virtually any dynamic DNS service provider and with any router that supports dynamic DNS. As a result, residential and small business users do not have to select a specific service provider or purchase a specific router with proprietary software in order to implement an effective firewall policy.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for associating a firewall policy with a dynamic domain name system (DNS) hostname, the method comprising:
   transmitting a first request to a names server to translate a first hostname into a corresponding network address;
   receiving a first network address from the names server in response to the first request;
   determining that the first network address is different than a second network address that is currently associated with the first hostname;
   associating the first network address with the first hostname;
   updating a first firewall policy configuration that is associated with the first hostname and includes a first record associating the first hostname with the second network address by replacing the first record with a second record associating the first hostname with the first network address; and
   after updating the first firewall policy configuration, transmitting a first message that includes at least a portion of the first firewall policy configuration to a recursive resolver,
   wherein the recursive resolver is configured to apply at least the portion of the first firewall policy configuration to network traffic associated with the first hostname.

2. The computer-implemented method of claim 1, further comprising:
   retrieving a parameter that specifies a duration of time that the second network address is valid; and
   waiting for the duration of time prior to transmitting the first request.

3. The computer-implemented method of claim 1, further comprising:
   transmitting a second request to the names server to translate the first hostname into a corresponding network address;
   receiving a third network address from the names server in response to the second request;
   determining that the third network address is the same as the first network address; and
   maintaining the second record that associates the first network address and the first hostname.

4. The computer-implemented method of claim 1, wherein the names server is associated with a dynamic DNS provider.

5. The computer-implemented method of claim 1, wherein the names server is configured to:
   receive the first network address from a router associated with a first client device; and
   in response to receiving the first network address, associate the first network address with the first hostname.

6. One or more non-transitory computer-readable storage media including instructions that, when executed by one or more processors, cause the one or more processors to associate a firewall policy with a dynamic domain name system (DNS) hostname, by performing the steps of:
   transmitting a first request to a names server to translate a first hostname into a corresponding network address;
   receiving a first network address and the first hostname from the names server;
   determining that the first network address is different than a second network address that is currently associated with the first hostname;
   associating the first network address with the first hostname;
   updating a first firewall policy configuration that is associated with the first hostname and includes a first record associating the first hostname with the second network address by replacing the first record with a second record associating the first hostname with the first network address; and
   after updating the first firewall policy configuration, transmitting a first message that includes at least a portion of the first firewall policy configuration to a recursive resolver,
   wherein the recursive resolver is configured to apply at least the portion of the first firewall policy configuration to network traffic associated with the first hostname.

7. The one or more non-transitory computer-readable storage media of claim 6, further comprising:
   determining that the first network address is associated with a time-to-live parameter that specifies a minimum amount of time that the first network address is valid;
   subsequent to receiving the first network address, waiting for a period of time specified by the time-to-live parameter; and
   transmitting a second request to the names server to translate the first hostname into a corresponding network address.

8. The one or more non-transitory computer-readable storage media of claim 6, further comprising:
   receiving the first hostname from a client device related to the first hostname; and modifying the first firewall policy configuration to include the first hostname.

9. The one or more non-transitory computer-readable storage media of claim 8, wherein the client device is associated with a router that supports dynamic DNS.

10. The one or more non-transitory computer-readable storage media of claim 9, wherein the names server is associated with a dynamic DNS provider and the router is configured to:
receive the first network address from an internet services provider (ISP); and
transmit the first network address to the names server.

11. The one or more non-transitory computer-readable storage media of claim 6, further comprising:
retrieving a parameter that specifies a duration of time that the second network address is valid; and
waiting for the duration of time prior to transmitting the first request.

12. The one or more non-transitory computer-readable storage media of claim 6, further comprising:
subsequent to receiving the first network address, waiting for a specified duration of time;
transmitting a second request to the names server to translate the first hostname into a corresponding network address;
receiving a third network address from the names server in response to the second request;
determining whether the third network address is the same as the first network address; and
if the third network address is the same as the first network address, then maintaining the second record that associates the first network address and the first hostname, or
if the third network address is not the same as the first network address, then updating the first firewall policy configuration by replacing the second record with a third record associating the first hostname with the third network address.

13. A computing device, comprising:
a memory that includes a policy configuration application; and
a processor that is coupled to the memory and, executes the policy configuration application by:
transmitting a first request to a names server to translate a first hostname into a corresponding network address;
receiving a first network address from the names server in response to the first request;
determining that the first network address is different than a second network address that is currently associated with the first hostname;
associating the first network address with the first hostname;
updating a first firewall policy configuration that is associated with the first hostname and includes a first record associating the first hostname with the second network address by replacing the first record with a second record associating the first hostname with the first network address; and
after updating the first firewall policy configuration, transmitting a first message that includes at least a portion of the first firewall policy configuration to a recursive resolver,
wherein the recursive resolver is configured to apply at least the portion of the first firewall policy configuration to network traffic associated with the first hostname.

14. The computing device of claim 13, wherein the names server is associated with a dynamic DNS provider.

15. The computing device of claim 13, wherein the processor further executes the policy configuration application by:
retrieving a parameter that specifies a duration of time that the second network address is valid; and
waiting for the duration of time prior to transmitting the first request.

16. The computing device of claim 13, wherein the processor further executes the policy configuration application by:
subsequent to receiving the first network address, waiting for a specified duration of time;
transmitting a second request to the names server to translate the first hostname into a corresponding network address;
receiving a third network address from the names server in response to the second request;
determining whether the third network address is the same as the first network address; and
if the third network address is the same as the first network address, then maintaining the second record that associates the first network address and the first hostname, or
if the third network address is not the same as the first network address, then updating the first firewall policy configuration by replacing the second record with a third record associating the first hostname with the third network address.

* * * * *